June 5, 1928.
A. H. MILLER
1,672,333
LICENSE PLATE HOLDER
Filed May 12, 1927
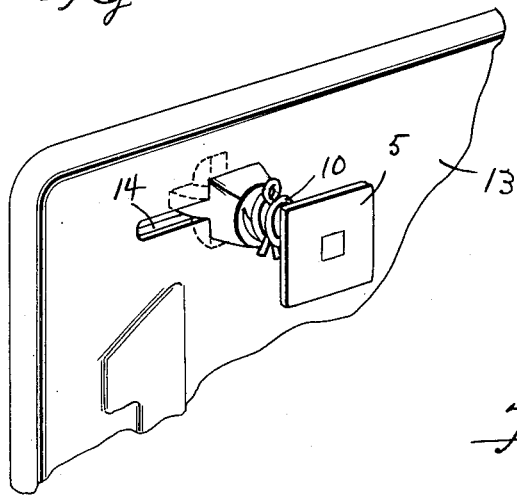
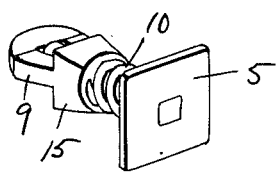
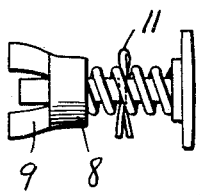
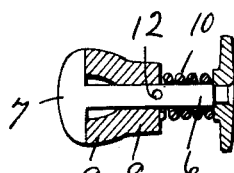
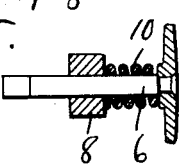
Inventor
*Albert H. Miller*
By *Clarence A. O'Brien*
Attorney Patented June 5, 1928.

1,672,333

UNITED STATES PATENT OFFICE.

ALBERT HENRY MILLER, OF PIERCE, NEBRASKA, ASSIGNOR TO ROY PETERS AND KENNETH L. GLAZE, BOTH OF PIERCE, NEBRASKA.

LICENSE-PLATE HOLDER.

Application filed May 12, 1927. Serial No. 190,869.

My invention relates to attaching devices for license plates of automobiles and has for an object to provide a device of this character by means of which the license plate may be securely attached to the automobile without the aid of tools of any character.

A further object is to provide a fastening device for securing license plates to automobiles which is simple in construction, easily operated to attach or detach the license plate, secure against accidental release of the fastener, neat and attractive in appearance and relatively inexpensive to manufacture.

Other objects and advantages reside in the special construction, combination and arrangement of the various elements as more fully hereinafter described and claimed, reference being had to the accompanying drawing forming a part hereof, wherein like numerals refer to like parts throughout and in which, Figure 1 is a fragmentary perspective view of a license plate showing my fastener in attached position thereon.

Figure 2 is a perspective view of the license plate holder,

Figure 3 is a side view thereof,

Figure 4 is a longitudinal sectional view showing the relative position of the parts when in attaching position, and Figure 5 is a similar view showing the device in position for attaching or removing.

Referring now to the drawing I have shown my invention comprising a plate or head 5 from which extends a shank 6 riveted or otherwise fixedly secured thereto. The end of the shank opposite from the head 5 is provided with a T-shaped head 7, the T-shaped head being integrally formed with the shank 6.

Upon the shank 6 is slidably arranged a collar 8 having wings 9 extending therefrom in a substantially U-shaped formation, the cross members of the T-heads 7 being adapted to seat within the recess formed by the wings 9 as shown in Figure 3 or to abut the ends of the wings in extended relation as shown in Figure 2.

Mounted upon the shank 6 between the base 5 and the collar 8 I interpose a coil spring 10, the spring serving to force the collar against the T-head 7 when the same is seated within the recess between the wings 9 or to force the ends of the wings 9 against the cross members of the head 7 when in extended position. A cotter pin 11 may be inserted in an opening 12 arranged in the shank to secure the parts against accidental displacement after the same has been arranged in attaching position.

In the operation of the device when it is desired to attach or detach a license plate indicated at 13 upon an automobile, the cotter pin 11 is removed and the collar 8 is slid longitudinally along the shank in a direction toward the base 5 and turned so that the ends of the wings 9 will abut against the cross members of the T-head 7, the parts thus being arranged in extended position as shown in Figure 2 of the drawings. The head 7 may then be inserted in the slot 14 of the license plate with the shoulder 15 of the collar 8 abutting one face thereof. The T-head 7 will then appear against the opposite face of the plate and by turning the same crosswise of the wing 9 the tension of the spring will operate to retain the same within the recess formed by such wings. The cotter pin 11 is then inserted and the fastener is then secure against removal.

It is obvious the device is susceptible to various changes and modifications without departing from the spirit of the invention or the scope of the appended claim and I accordingly claim all such forms of the invention to which I am entitled.

I claim:

In a license plate fastener, a shank having heads formed at each end thereof, one of said heads being of substantially T-shaped formation, a collar slidably arranged on said shank, a pair of wings formed on said collar adapted to have said T-head inserted therebetween, shoulders formed on said collar at the base of said wings, said T-shaped head and said wings being adapted for insertion through a license plate attaching opening with the shoulders of the collar abutting one side of the plate and the wings protruding through the opposite side thereof, said shank having a coil spring mounted thereon whereby to force said collar in engagement with said license plate at one side thereof and urging the T-shaped head between said wings at the opposite side thereof, said wings serving to prevent rotation of the head when engaged therewith, and means removably carried transversely of the shank and adjustably disposed with respect to the convolutions of the spring whereby to regulate the tension thereof.

In testimony whereof I affix my signature May 7, 1927.

ALBERT HENRY MILLER.